E. E. McCOLLUM.
SPEED REDUCTION MECHANISM FOR METERS.
APPLICATION FILED MAR. 28, 1918.
1,310,760.
Patented July 22, 1919.
3 SHEETS—SHEET 1.
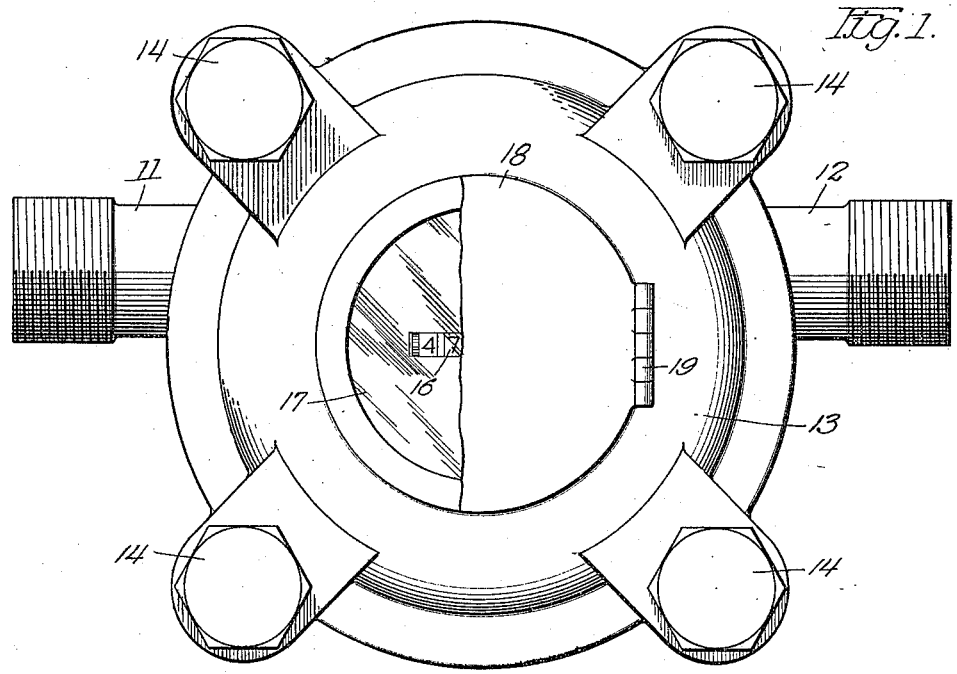
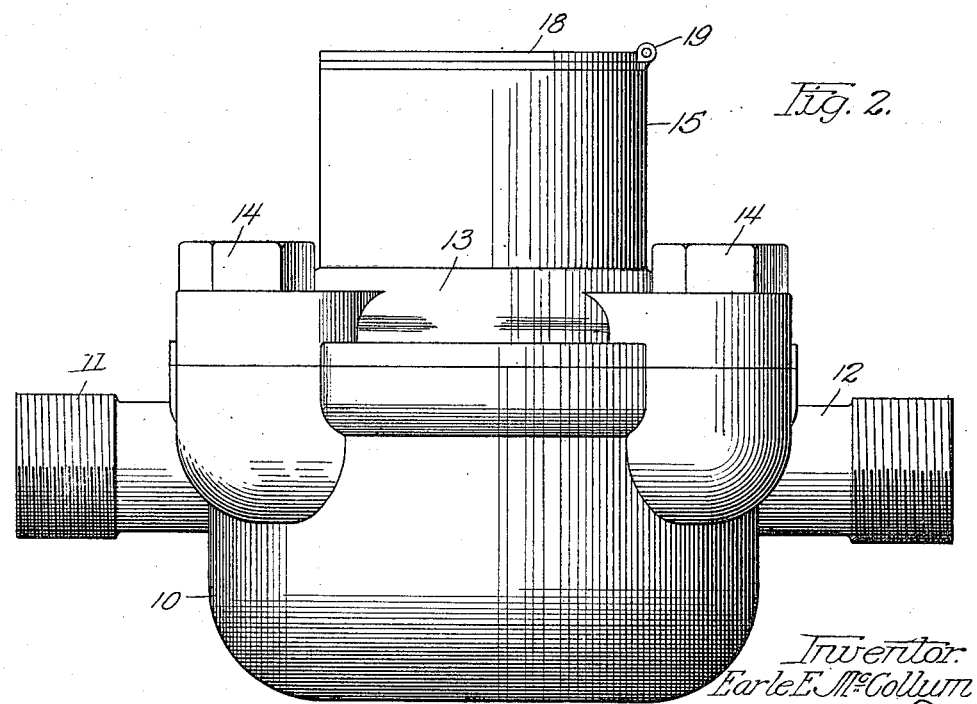

E. E. McCOLLUM.
SPEED REDUCTION MECHANISM FOR METERS.
APPLICATION FILED MAR. 28, 1918.

1,310,760.

Patented July 22, 1919
3 SHEETS—SHEET 2.

Inventor:
Earle E. McCollum.
Foxie Rain & Cook
Attys.

E. E. McCOLLUM.
SPEED REDUCTION MECHANISM FOR METERS.
APPLICATION FILED MAR. 28, 1918.
1,310,760.
Patented July 22, 1919.
3 SHEETS—SHEET 3.
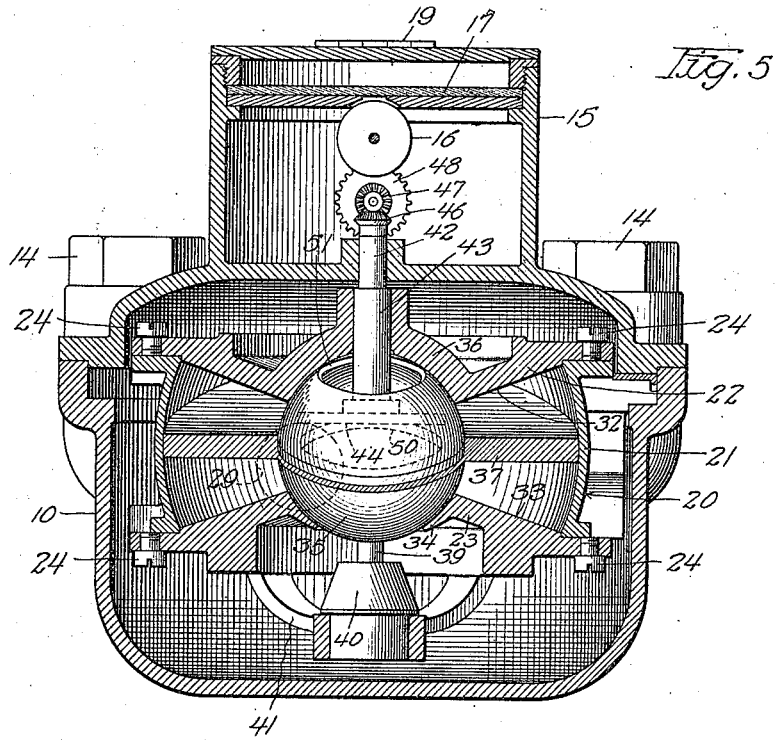
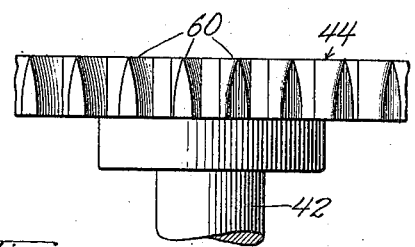
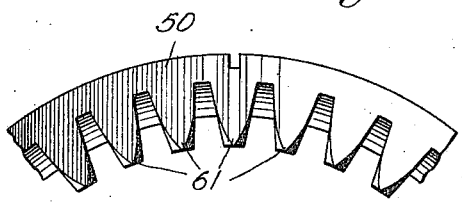
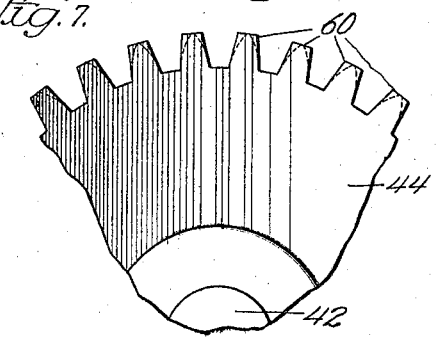
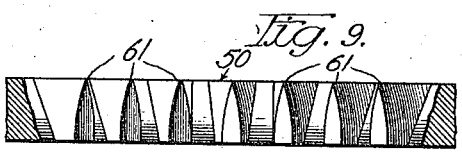

UNITED STATES PATENT OFFICE.

EARL E. McCOLLUM, OF DOWNERS GROVE, ILLINOIS.

SPEED-REDUCTION MECHANISM FOR METERS.

1,310,760.  Specification of Letters Patent.  Patented July 22, 1919.

Application filed March 28, 1918. Serial No. 225,166.

*To all whom it may concern:*

Be it known that I, EARL E. MCCOLLUM, a citizen of the United States, residing at Downers Grove, in the county of Dupage and State of Illinois, have invented certain new and useful Improvements in Speed-Reduction Mechanism for Meters, of which the following is a specification.

My invention relates to improvements in speed reduction mechanism for meters and has especial reference to meters for measuring water or other liquids.

One of the special objects of my invention is to provide a simple, cheap, durable and reliable means adaptable for reducing the speed of a medium that transmits motion from a rotatively-oscillatable non-rotatable disk, of a water meter, to the recording index thereof.

In water meters of the disk type, a disk is laterally enlarged, near its axis, into a hollow ball or sphere, upon which it is supported between two adjacent fixed plates. The plates are provided, each with a suitable socket part to receive the adjacent parts of the ball. The ball-and-socket connection, between the ball and the respective socket part on either side of the disk, permits free movement of the disk and ball therein and at the same time provides a water tight joint to prevent water from leaving the space between said plates. In such meters the disk is prevented from rotating, by a fixed gate secured between the aforesaid plates and a wall which surrounds the plate. The gate is included in a radially disposed slot, in the disk, which extends from a vertical wall surrounding the fixed opposed plates and the ball, carried by the disk. This arrangement permits the disk to be oscillated progressively in a rotary direction but prohibits the disk from being rotated on its axis. The disk therefore will move around a vertical axis with its face always in an oblique plane. Projecting from the axis of the disk, at right angles from its face, and from the end of the ball on one side, is a stem, fixed to the ball. When the disk is rotatively oscillated about the center of the ball, the end of the stem describes a true circle around the axis of the opposing sockets, between which the ball is contained and by which the disk is oscillatably supported.

In meters of this type, heretofore constructed, the end of this stem is rotatably connected to a crank arm, revoluble about the same axis, and which communicates the number of revolutions that the stem makes, which is indicative of the complete oscillatory cycles of said disk in a given time, to a speed reducing mechanism intervening between the stem and the indices that are visible from the face of the meter.

The speed reducing mechanism, in such meters, is complicated, consisting of many delicate parts; expensive to produce and sensitive to the deleterious effect produced by the water and other harmful results due to the usual environment of the meter.

In carrying my invention into effect I reverse the ball and place the gyratory stem at the bottom of the disk and provide a fixed truncated cone with its axis coaxially arranged with the aforesaid axis and use it as a guide, against the tapered face of which the stem bears in its rotary excursion. This stem is revoluble about the cone, but the disk is not.

Concentric with the stem, projected from one side of the ball and within the ball I place an internally geared ring having teeth tapered on one edge and in mesh with a gear wheel, having similar teeth, with which the teeth of the internal gear or ring member engage but having one less tooth than those contained in the internal gear.

When the disk member is oscillated, by the action of the liquid to be measured passing through the meter, the two geared members will have their meshing engagement changed progressively in circumferential sequence, and therefore the disk, not being permitted to rotate, will rotatably displace the spur gear member one tooth, for each cyclic oscillation of the disk, or proportionally to the difference in the number of teeth in the two gear members. Therefore, if, for example, the internal gear has 50 teeth and the spur gear has 49 teeth it will require approximately fifty oscillations of the disk to produce one revolution of the spur gear member.

I have shown the speed reducing gearing in association with a water meter of well known type, in which:

Figure 1 is a plan view of the meter.
Fig. 2 is a side elevation.
Fig. 3 is a section taken on line 3—3 of Fig. 4.
Fig. 4 is a section taken on line 4—4 of Fig. 3.

Fig. 5 is a section taken on line 5—5 of Fig. 4.

Fig. 6 is a side elevation of a fragment of the rotatable spur gear.

Fig. 7 is a plan view thereof.

Fig. 8 is a face view of a fragment of the oscillatable internal gear.

Fig. 9 is a side elevation looking at the teeth.

In all the views the same reference characters are employed to indicate similar parts.

Figure 3:
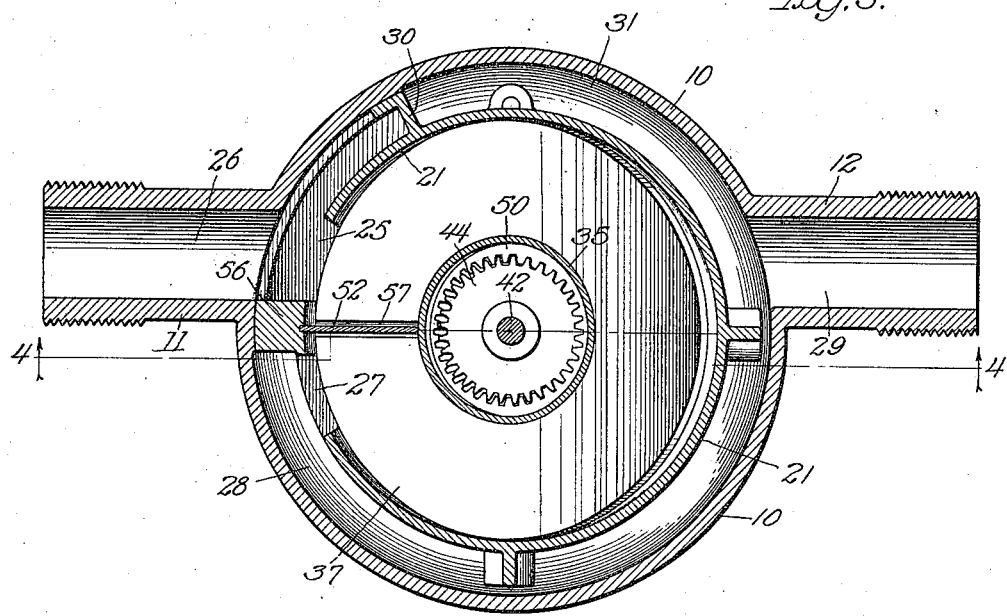
Figure 4:
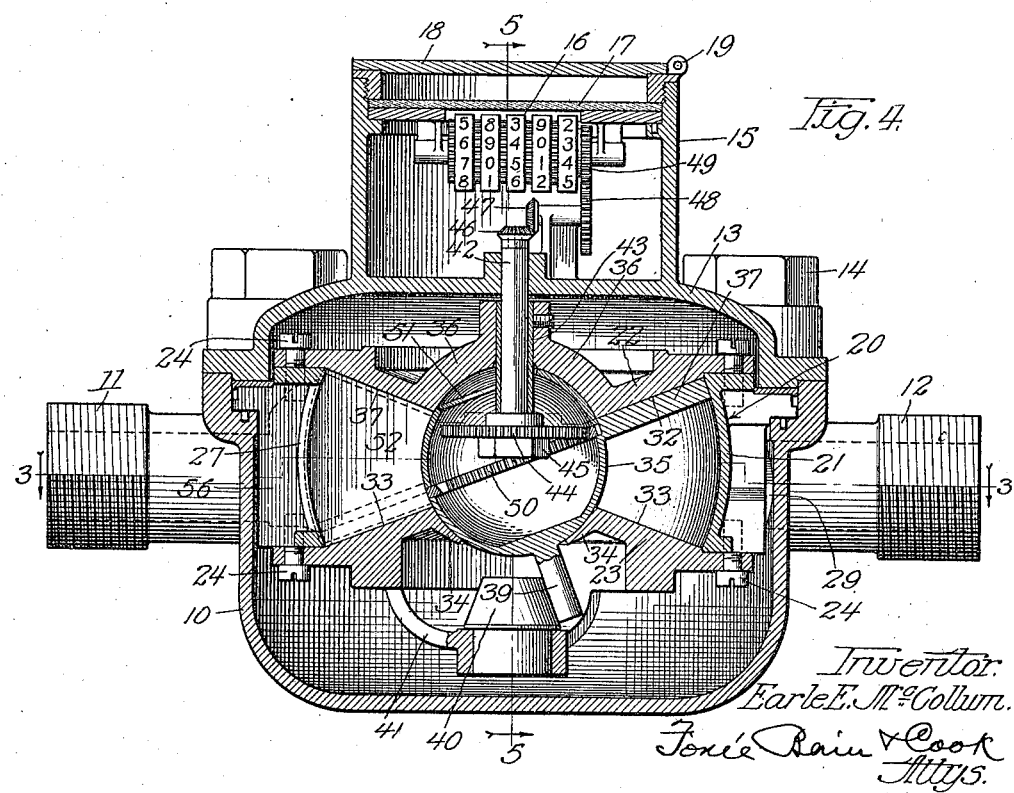

10 shows the main part of the meter casing having threaded cylindrical hollow projections 11 and 12 for connection to a pipe system within which the meter is to be located. The water enters the body part 10 through the opening 11 and passes out through the opening 12. A top part of the casing 13 is secured to the main portion by bolts 14. A cylindrical portion 15 rises vertically from the top 13 and contains the index which is visible through the glass plate 17 when the cover 18 is open. The latter is hinged, at 19, to the cylindrical portion 15.

Within the casing, comprising the parts 10 and 13, is another casing 20 comprising an annular side wall 21 which is transversely curved internally on a radial line taken from its center, and which separates the plates 22 and 23. The plates 22 and 23 are held to the annular wall 21, by screws 24. The wall 21 is provided with an opening, as at 25, for the entrance of the water coming through the opening 26 in the terminal 11 and another opening 27 for the discharge of the water into an opening 28 contained between the casing 10 and the annular wall 21, through which the water flows, after passing through the operative, internal casing 20, to the opening 29 in the member 12. A projection 30, from the wall 21, makes contact with the inner surface of the casing 10 and prevents the water from passing from the opening 26 around and through the channel 31 to the opening 29, so that it becomes necessary for the water to pass through the openings 25 and around in the inner surface of the wall 21 to the exit 27. The plates 22 and 23 on the inside surfaces are conical in shape, as at 32 and 33. Near the center of the lower plate 23 there is a socket part 34 to receive a hollow ball 35. The plate 22 is provided with a socket 36 to receive the upper surface of the hollow ball 35. The axes of the socket parts and of the ball are in a common vertical plane. Surrounding the hollow ball 35 is a rotatively-oscillatable disk 37, which extends between the walls 21 and is oscillatable with the ball 35 in the casing 20. The ball 35 is provided with a stem 39 which projects from the ball, at right angles to the face of the disk 37, or substantially in alinement with the axis of the disk 37. A stationary plug 40, in shape of a truncated cone, is held in a spider 41, and serves as a guide for the stem 39. A vertically extending shaft 42 in the same axial plane with the socket parts, the ball and plug 40, has bearing in a tube 43, which is supported in the upper plate 22, and passes into the chamber of the casing 15. On its lower end it carries a rotatable spur gear 44, which is fixed thereto, as by a nut 45, and on its upper end it carries a small beveled gear 46, to mesh with a similar gear 47, that is connected to the index wheels 16, by a spur gear 48 and another spur gear 49. An internal relatively-oscillatable gear or ring 50, is secured in the ball 35 in the same diametric plane with the disk 37. It meshes, at all times, with the spur gear 44 in whatever relative position the disk may be. The spur gear, preferably, has a lesser number of teeth in its periphery than is contained in the internal gear 50.

The ball 35 is cut away, near its top surface, as at 51, to permit it to gyrate around the tube 43 containing the shaft 42.

A gate 52, is placed between the ball 35 and a projection 56 within the casing 10, and extends through a radially extending slot 57 in the disk 37. This plate extends between the upper and lower plate 22 and 23 and prevents the water from passing from the opening 25 directly to the opening 27. The edge of the slot 37 is beveled, so as to make a close joint fit with the plate 52 in whatever position the disk may be with respect thereto. The gate 52 also prevents the disk 37 from rotating but permits it to be oscillated rotatively.

When the water enters the opening 25 from the pipe 26 it must pass around the disk between the ball 35 and the wall 21 and between the upper surface of the disk and the coned plate 22 until it reaches the opening 27. Then it passes out through that opening and through the lower casing to the opening 29, thus traversing the entire space between the upper surface of the disk 37 and the plate 22, causing said disk to rotatively oscillate. The complete cyclic oscillation of the disk, causes the shaft 42 to be moved, in a rotary direction, proportional to the difference in the number of teeth carried by the spur gear 44 and the internal gear 50. If, for example, the internal gear 50 has fifty teeth and the spur gear has forty-nine teeth, then it would require substantially fifty oscillations, or cyclic operations of the disk 37 before the shaft 42 would be rotated one revolution.

It will be apparent, from an examination of the enlarged views of the gear wheels 44 and 50, as shown in Figs. 6 to 9 inclusive, that the teeth 60 and 61 are tapered at their confronting surfaces so as to more readily engage as the disk is being oscillated.

While I have shown my invention applied to a water meter, it is manifest that it could be used for other purposes, and while I have described the internal gear as the oscillating member, it would be within the spirit of my invention to oscillate the spur gear and rotate the internal gear.

Having described my invention, what I claim is:—

1. A speed reducing mechanism comprising a spur gear rotatable about an axis at right angles to its face; a rotatively-oscillatable, non-rotatable hollow ball open at one end; an internal gear in said ball, in mesh with said spur gear therein and having a different number of teeth, and oscillatable about the axis of said spur gear, whereby to rotatively displace said spur gear an extent proportional to the difference in the number of teeth in the respective gears for each cycle of oscillation of said internal gear.

2. A speed reducing mechanism comprising a spur gear rotatable about an axis at right angles to its face; a rotatively-oscillatable, non-rotatable hollow ball open at one end; an internal gear in said ball, in mesh with said spur gear therein and having a different number of teeth, and oscillatable about the axis of said spur gear with its face in a constantly changing plane oblique to the axis of said spur gear, whereby to rotatively displace said spur gear an extent proportional to the difference in the number of teeth in the respective gears for each cycle of oscillation of said internal gear.

3. A speed reducing mechanism comprising an internal gear; a spur gear, angularly related to said internal gear and in mesh on one side therewith; a hollow ball in which said gears are contained; means to rotatively oscillate one of said gears without rotating it, to bring the teeth of the gears successively into mesh, whereby to rotatively displace the other gear an extent substantially proportional to the difference in the number of teeth in said gears for each cycle of oscillation of said oscillatable gear, and means projecting from the ball in coöperation with a stationary part to guide the ball in its movement.

4. A speed reducing mechanism comprising a disk piston comprising in part a hollow ball, rotatively-oscillatable about its axis; means to prevent its rotation and permit its oscillation; an internal gear, and a spur gear within said ball, having a different number of teeth, one of which gears is mounted for rotation and the other gear axially secured to said disk piston, said spur gear being in mesh on one side with the internal gear, whereby to rotatively displace the rotatable gear an extent proportional to the difference in the number of teeth in said gears for each cyclic oscillation of said piston when said disk is oscillated.

5. A speed reducing mechanism for a meter comprising a gear rotatable about an axis at right angles to its face; another gear having a different number of teeth; means for imparting to the latter gear a gyratory motion movable to cause it to mesh consecutively with the teeth of the first mentioned gear, the engagement of the teeth being initiated by approach of confronting tapered faces of the teeth of the respective gears, the teeth of both gears, near their confronting faces, being pointed to facilitate engagement.

In testimony whereof I hereunto set my hand.

EARL E. McCOLLUM.

Copies of this patent may be obtained for five cents each, by addressing the "Commissioner of Patents, Washington, D. C."